(12) United States Patent
Patel et al.

(10) Patent No.: US 7,063,156 B2
(45) Date of Patent: Jun. 20, 2006

(54) TUBING FILL AND TESTING VALVE

(75) Inventors: Dinesh R. Patel, Sugar Land, TX (US); David E. Sask, Kingston (CA)

(73) Assignee: Schlumberger Technology Corporation, Sugar Land, TX (US)

(*) Notice: Subject to any disclaimer, the term of this patent is extended or adjusted under 35 U.S.C. 154(b) by 65 days.

(21) Appl. No.: 10/417,015

(22) Filed: Apr. 16, 2003

(65) Prior Publication Data

US 2004/0026091 A1 Feb. 12, 2004

Related U.S. Application Data

(60) Provisional application No. 60/373,540, filed on Apr. 16, 2002.

(51) Int. Cl.
*E21B 34/10* (2006.01)

(52) U.S. Cl. ............... 166/332.8; 166/321; 166/334.1; 166/374

(58) Field of Classification Search ............ 166/332.8, 166/334.1, 325, 321, 374; 137/515, 515.5, 137/515.7, 527, 527.6, 527.4; 251/298
See application file for complete search history.

(56) References Cited

U.S. PATENT DOCUMENTS

| 3,958,633 | A | * | 5/1976 | Britch et al. ............. 166/117.5 |
| 4,033,429 | A | * | 7/1977 | Farr ............................ 181/106 |
| 4,100,969 | A | * | 7/1978 | Randermann, Jr. .......... 166/324 |
| 4,122,898 | A | * | 10/1978 | Nelson ....................... 166/325 |
| 4,134,455 | A | * | 1/1979 | Read ........................ 166/334.1 |
| 4,694,903 | A | | 9/1987 | Ringgenberg |
| 6,568,470 | B1 | * | 5/2003 | Goodson et al. ........... 166/66.5 |
| 2003/0121665 | A1 | * | 7/2003 | Trott et al. ............... 166/332.8 |

FOREIGN PATENT DOCUMENTS

| EP | 0250144 A2 | 12/1987 |
| EP | 0250144 A3 | 12/1987 |
| GB | 2318375 A | 4/1998 |
| GB | 2372770 A | 9/2002 |

* cited by examiner

*Primary Examiner*—David Bagnell
*Assistant Examiner*—G M Collins
(74) *Attorney, Agent, or Firm*—Trop, Pruner & Hu, P.C.; Kevin P. McEnaney; Jaime A. Castano

(57) ABSTRACT

The present invention provides for a valve in a tubing string that allows the tubing string to fill with well fluids as the string is assembled and lowered into a well bore, but can be used to check pressure integrity of the tubing string during various stages of the assembly.

15 Claims, 7 Drawing Sheets

TUBING FILL AND TESTING VALVE

This application claims the benefit of U.S. Provisional Application 60/373,540 filed Apr. 16, 2002.

BACKGROUND

1. Field of Invention

The present invention pertains to valves used in subsurface well completions, and particularly to valves in tubing strings that allow well fluids to freely enter the tubing string from below the valve, but can isolate the tubing string below the valve from pressure applied to the fluid in the tubing above the valve.

2. Related Art

Tubing used in a subsurface well, such as production tubing, is generally assembled at the well site using sectional lengths or "joints". A first joint is lowered into the well bore until its upper end is at the well bore (or platform) surface. Each successive joint after the first is then joined to the joint just below it, conventionally using "box and pin" threaded connectors, and the assembled section of tubing string is lowered into the well bore by the length of the added joint. The process is repeated until a tubing string of desired length is assembled.

It is generally desirable to allow well bore fluids to enter the tubing as it is lowered into the well bore. This is easily achieved by having an open bottom on the first joint, or otherwise providing fluid communication between the well bore and the tubing interior, such as by providing ports. However, it is important to insure the assembled tubing string can hold pressure. To insure pressure integrity, an operator needs to occasionally test such integrity, as various joints are added, by applying pressure to the fluid in the tubing interior. However, the fluid communication path between the well bore and the tubing interior prevents such pressure from building unless the communication path is selectively blocked.

One attempted solution uses a first nipple that is placed above a packer as part of the tubing string. A first plug can be run on slick line, wireline, coiled tubing, or pipe and set inside the first nipple to block communication between the well bore and the tubing interior. That allows pressure-testing the tubing to full pressure without setting the hydraulic set packer. With that configuration, the packer setting intake pressure port is not exposed to the tubing pressure that occurs above the plug. After pressure-testing, the first plug is removed and the tubing string is further assembled.

That method requires an intervention to set and remove the plug each time an operator wishes to pressure-test the tubing string. In addition, to set the hydraulic set packer, a second nipple must be included in the tubing string below the packer. A second plug is run and set inside the second nipple below the packer, and pressure is applied in the tubing to set the packer. The plug is then removed. This requires further intervention which translates to expensive rig time, especially in an offshore environment. Also, each intervention increases the risk of getting stuck in the hole, and could create a hazardous situation.

In an alternative solution, a nipple and plug is run below the packer, and a tubing fill valve is run above the nipple/plug, but below the packer. The tubing is filled through the packer filling valve. The packer filling valve is closed, preferably using some intervention-less method such as pumping fluid from tubing to annulus at a certain rate to create a pressure differential from tubing to casing that can be used to close the tubing fill valve. Pressure can then be applied in the tubing to pressure test tubing integrity. The hydraulic packer setting port is exposed to the tubing pressure since the plug (in this case) is run below the packer. Hence, the tubing can not be tested to the desired full pressure without setting the packer. Packer setting pressure is normally lower then the desired tubing test pressure. Therefore, the tubing can be tested only to the lower packer setting pressure, and that is undesirable in most cases.

After the (lower) pressure test, the tubing fill valve must be reopened by some means to allow the tubing to fill as the tubing is assembled and lowered into the hole. This takes more rig time and there is a possibility of swabbing the packer's sealing element due to fluid flowing past the packer element at a high rate while the tubing fill valve is not reopened.

Thus, a need exists to selectively isolate the fluid communication between the tubing interior and the well bore whenever desired while running in the hole, while still allowing the well bore fluids free entry into the tubing interior when pressure integrity is not being tested. There also exists a need to allow pressure-testing of the tubing to a desired pressure that is generally higher then the packer setting pressure, without setting the packer during the pressure test.

SUMMARY

The present invention provides for a valve in a tubing string that allows the tubing string to fill with well fluids as the string is assembled and lowered into a well bore, but can be used to check pressure integrity of the tubing string during various stages of the assembly.

Advantages and other features of the invention will become apparent from the following description, drawings, and claims.

DETAILED DESCRIPTION

Figure 1:
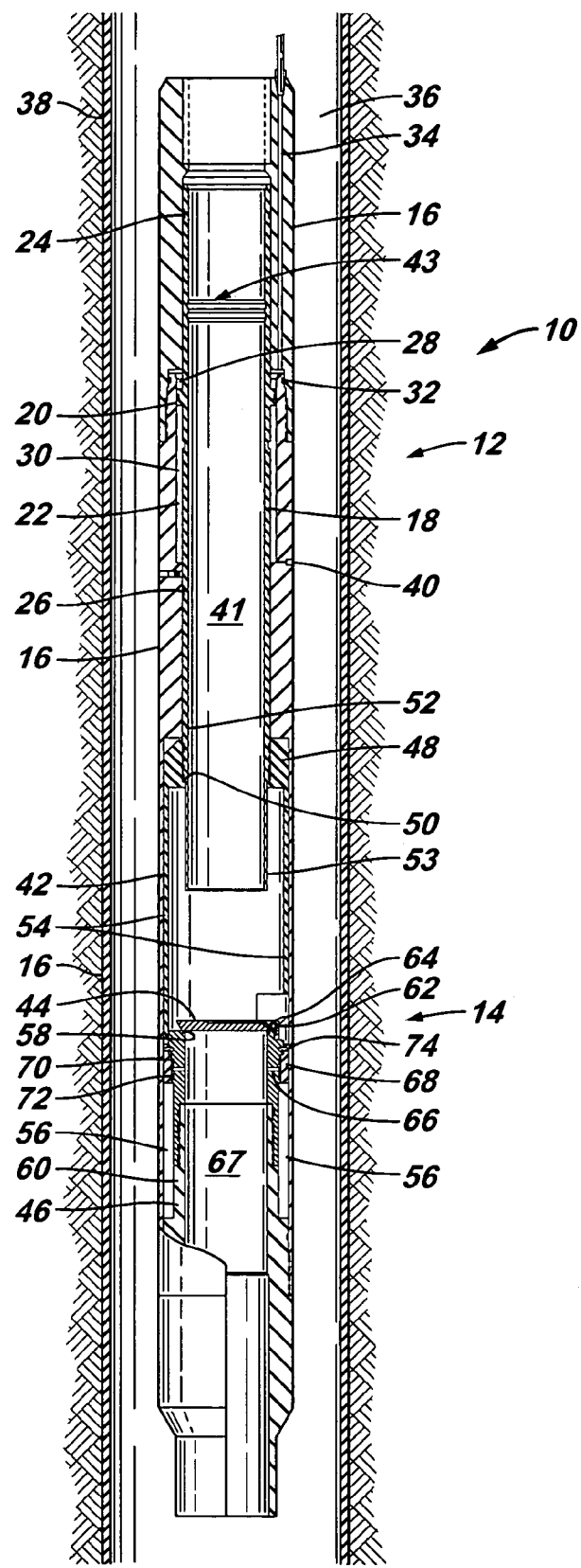
FIG. 1 is a partial cross section and schematic view of a tubing fill and testing valve constructed in accordance with the present invention.
Figure 2:
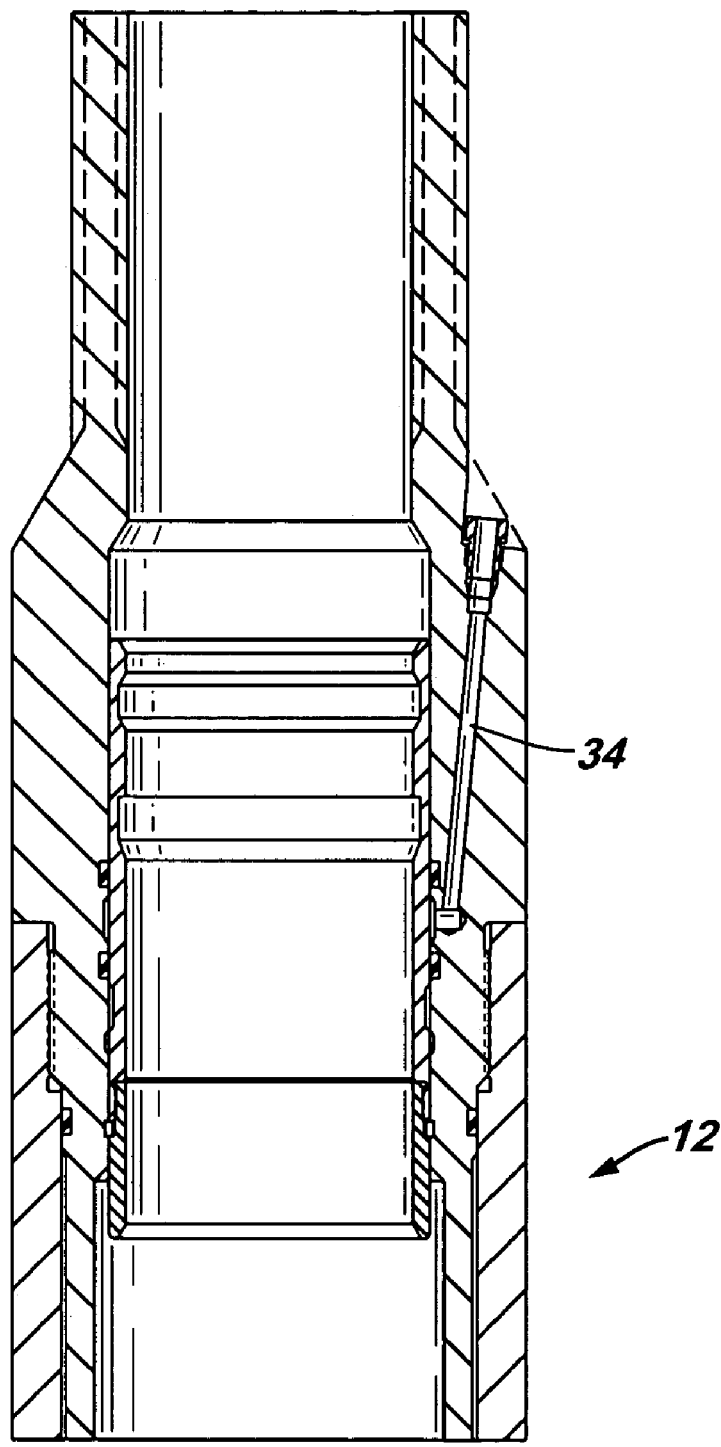
FIGS. 2–7 are enlarged sectional views of the invention of FIG. 1.
Figure 3:
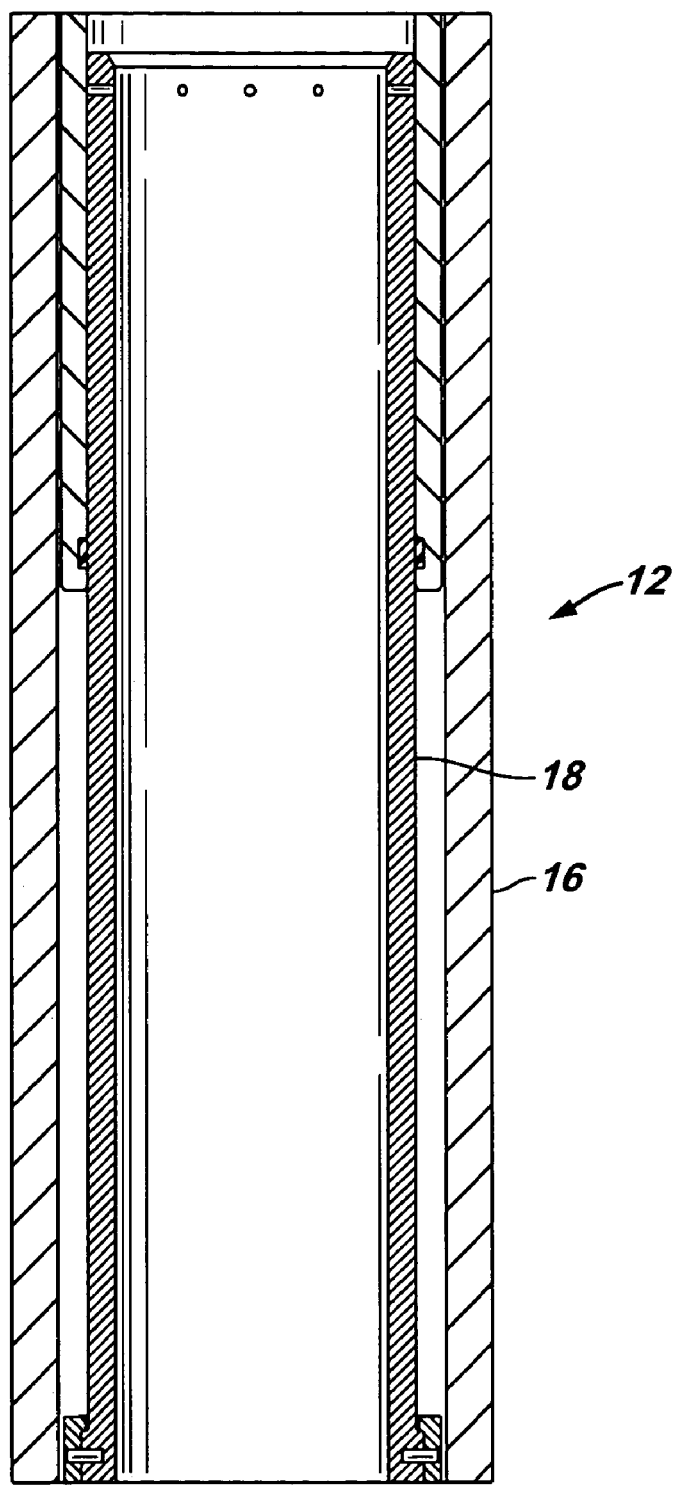
Figure 4:
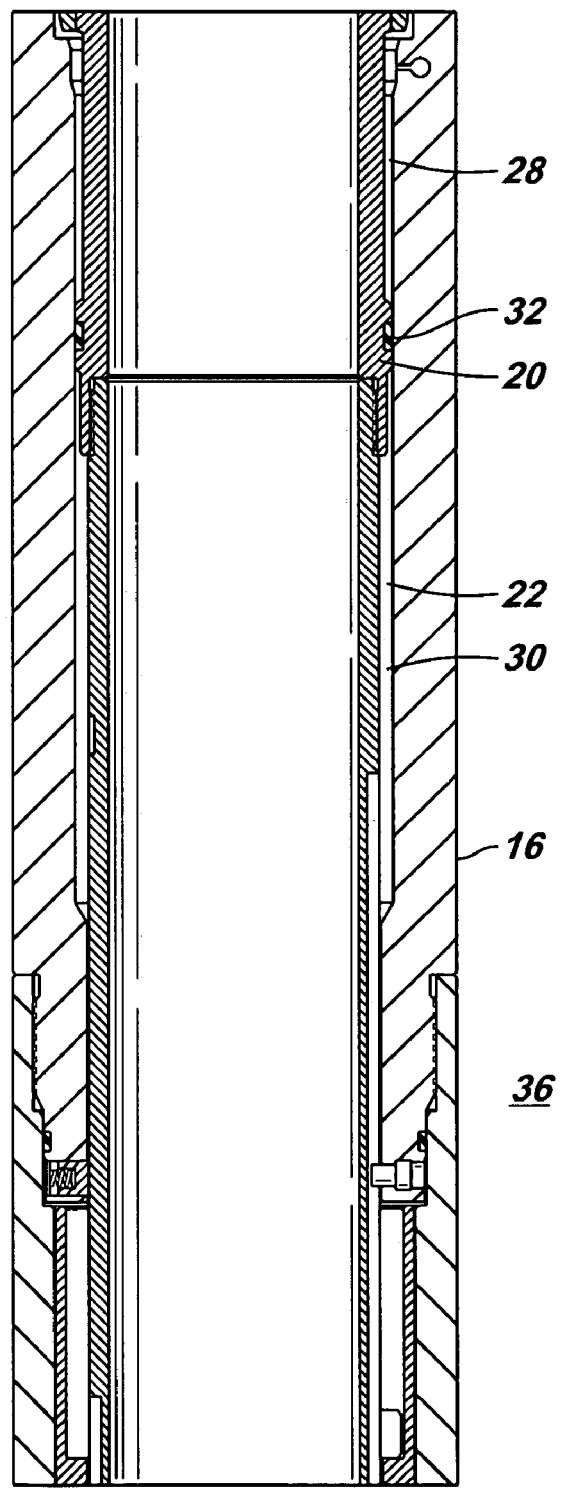
Figure 5:
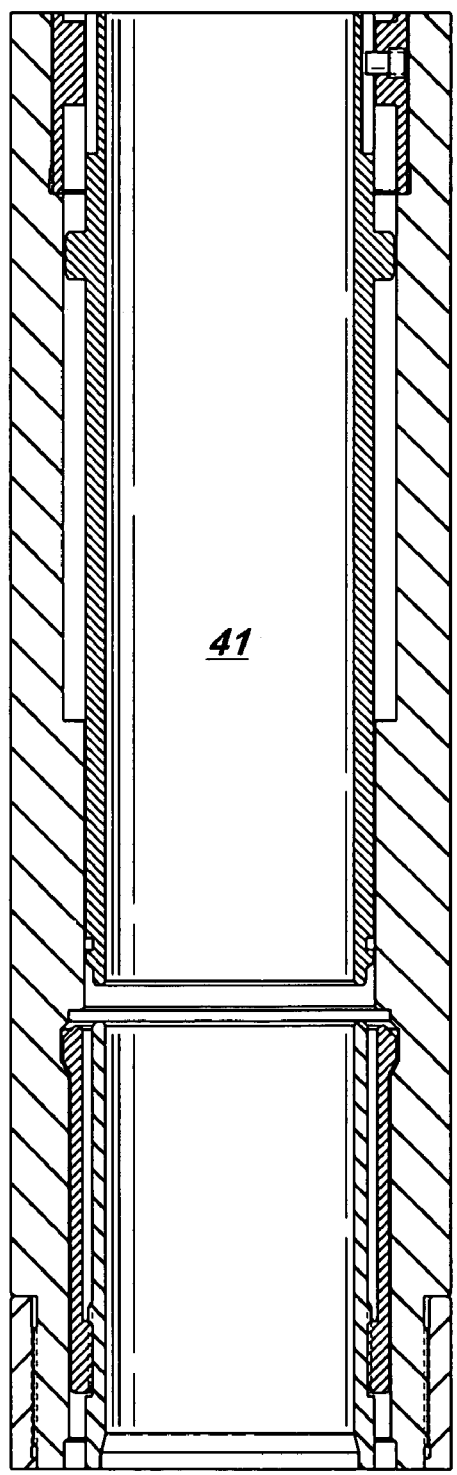
Figure 6:
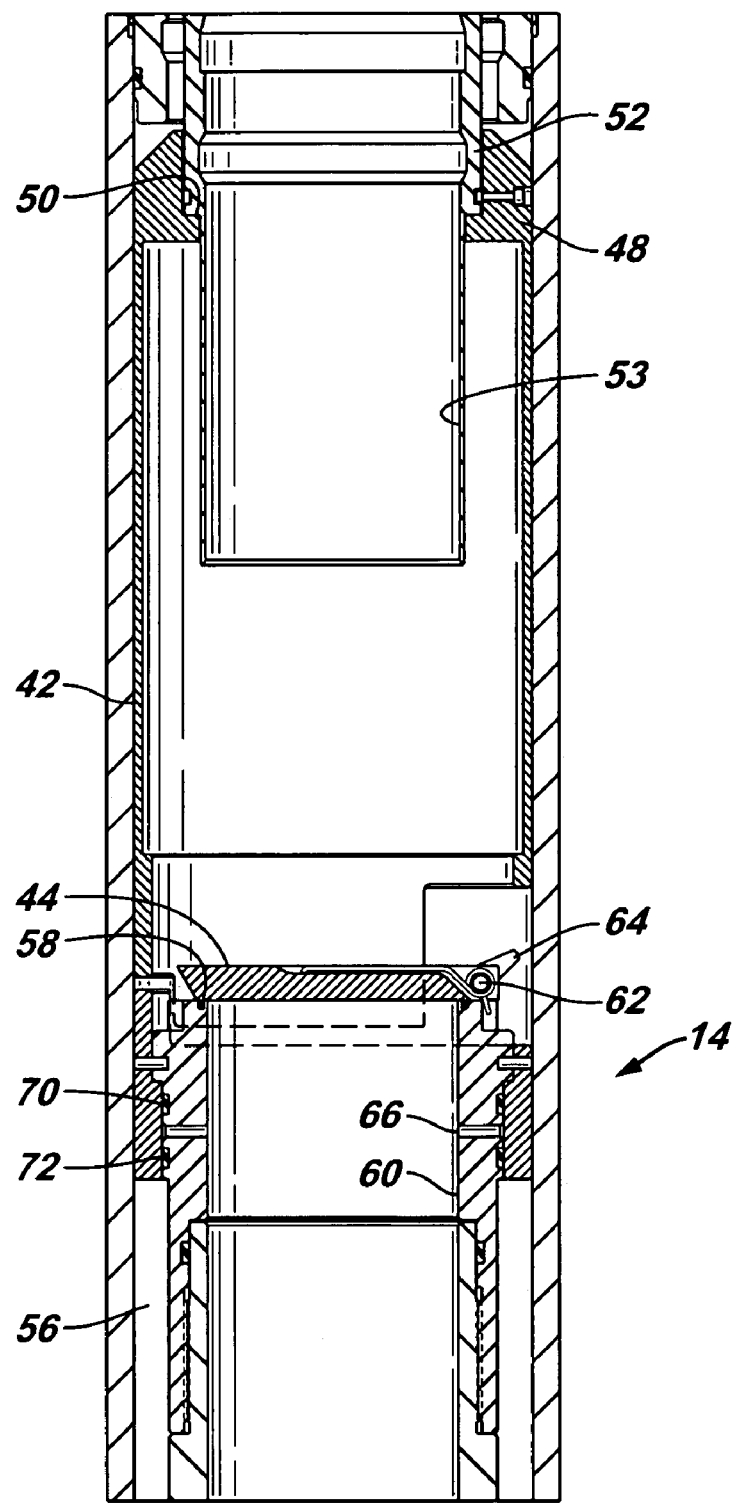
Figure 7:
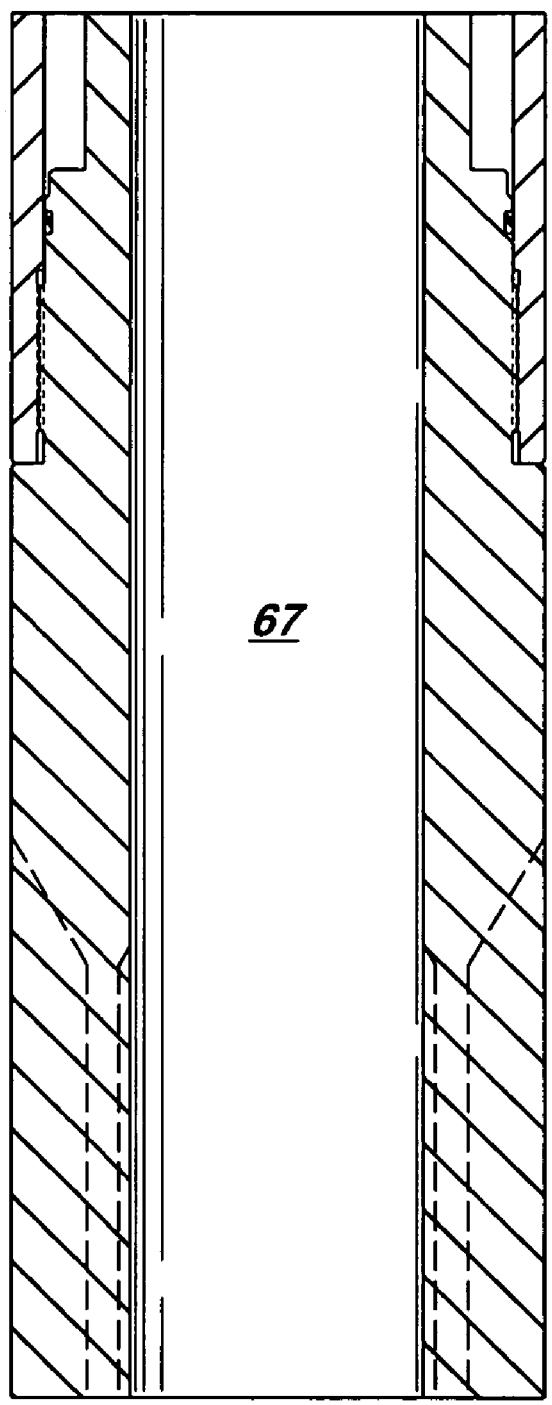

Referring to all the figures, but particularly to FIG. 1, a tubing fill and testing valve 10 comprises a power module 12 and a valve module 14. Power module 12 and valve module 14 are mounted in a housing 16. Housing 16 may be a single piece or may comprise multiple members joined in a conventional manner such as threaded connections.

Power module 12 comprises a moveable power sleeve 18 having a piston head 20 that travels within a sealed chamber 22. Chamber 22 is defined above and below by seals 24 and 26, respectively, and is divided into an upper chamber 28 and a lower chamber 30 by a seal 32 carried by piston head 20. Upper chamber 28 is in fluid communication with a control line 34 (although a fluid communication path between the upper chamber 28 and the control line 34 is not shown in the cross-sections of the valve 10 shown in the figures). Lower chamber 30 is in fluid communication with an annular region 36 between housing 16 and a well bore or casing 38 via a port 40. Seals 24, 26, and 32 all seal against an inner surface of housing 16. The inner surface of housing 16 is recessed slightly in the region where piston head 20 travels to accommodate piston head 20. Power sleeve 18 has a smooth profile along most of its inner surface. The smooth inner profile defines an interior passageway 41 through an upper portion of tubing fill and testing valve 10. A deviation from that smooth inner profile is a selective profile 43 located on the inner surface of power sleeve 18.

Valve module 14 comprises a moveable valve sleeve 42, a flapper 44, and a tubing 46. Valve sleeve 42 has an upper end 48 having a shoulder 50 adapted to receive and engage a lower end 52 of power sleeve 18. Lower end 52 has a liner sleeve 53 that extends passageway 41 some length below shoulder 50. When lower end 52 is received and engaged by upper end 48, valve sleeve 42 and power sleeve 18 move in unison. Valve sleeve 42 has a tapered or contoured lower end 54 such that valve sleeve 42 is longer on one side than on the opposite side. An annular recess 56 exists between tubing 46 and housing 16. Recess 56 receives lower end 54 of valve sleeve 42 when valve sleeve 42 moves to its lower position within housing 16.

Tubing 46 has a seat 58 located on an upper end 60 of tubing 46. Flapper 44 is pivotally attached by hinge 62 to upper end 60 of tubing 46. Flapper 44 may be biased by a spring (not shown) to a closed position. When flapper 44 is in its closed state, flapper 44 seals against seat 58. Flapper 44 has a protruding tang 64 extending past hinge 62 above recess 56. Tubing 46 also has a port 66 to allow fluid communication between an interior passageway 67 of tubing 46 and recess 56. An isolation sleeve 68 is moveably mounted on tubing 46 within recess 56. Isolation sleeve 68 carries seals 70, 72 to block port 66 when isolation sleeve 68 is positioned such that seals 70 and 72 seal on an outer surface of tubing 46 above and below port 66. Isolation sleeve 68 may be held in place over port 66 by shear pins 74.

In operation, tubing fill and testing valve 10 is run into well bore 38 on completion string. Tubing fill and testing valve 10 can be placed and held in its open state or it can be preferably placed in its closed state since well fluids would not be prevented from entering interior passageways 41 and 67 from beneath flapper 44. Even if the flapper is biased closed, the bias would not be so strong as to offer substantial resistance to entry of fluids from below. At any desired depth, a pressure integrity test can be performed by applying fluid pressure within passageway 41 above closed flapper 44. The pressure drives flapper 44 toward its sealed configuration. Such pressure tests can be run at various depths as the length of the completion string increases.

Upon reaching a desired depth, and after completing all pressure tests, pressurized fluid can be applied through control line 34 to place and hold flapper 44 in its open state. The pressurized fluid bears on piston head 20 through upper chamber 28. The pressurized fluid drives power sleeve 18 downward, which forces valve sleeve 42 downward as well. As valve sleeve 42 moves downward, its longer side encounters isolation sleeve 68. Continued downward motion shears off shear pins 74 and pushes isolation sleeve 68 downward into recess 56 to expose port 66, allowing fluid communication between the passageways 41 and 67. This allows pressure differences across flapper 44 to equalize.

Continued downward motion causes the shorter side of valve sleeve 42 to encounter and bear on tang 64. This forces flapper 44 to pivot open. Still further downward motion causes liner sleeve 53 to pass alongside the (now raised) lower surface of flapper 44 and engage upper end 60 of tubing 46. Thus, passageways 41 and 67 are then joined. Flapper 44 is trapped in the open position between the outer surface of liner sleeve 53 and an inner surface of valve sleeve 42. Flapper 44 is out of the flow path. Thus, there is no danger of hanging an intervention tool on flapper 44 as it is now isolated.

Selective profile 43 is provided to allow a shifting tool to be latched onto power sleeve 18 should fluid pressure not suffice, fluid communication through control line 34 be blocked or severed, or there is otherwise some failure of the fluid to move power sleeve 18. The shifting tool can be run, for example, on coiled tubing, wireline, slick line, or drill pipe to push or pull power sleeve 18 down or up to open or close valve 10. In the existing arts, to open a flapper valve, a flapper actuator, commonly called a flow tube, impinges on the flapper such that the flapper rotates away from the actuator. The actuator pushes on the sealing side of the flapper, swings the flapper open, and passes beside the flapper to cover it and form an unobstructed flow path. In conventional fill tube valves using a flapper valve, it is not possible to open the flapper using a mechanical shifting tool because the flapper actuator is below the closed flapper valve. To mechanically access the flapper actuator, the flapper must first be opened. The present invention allows the flapper actuator to be placed on the upper (non-sealing) side of the flapper. Thus, a shifting tool can be run in and latched to the actuator even if the flapper is in the closed position.

The present invention also increases the diameter through the flapper valve compared to prior art valves. In prior art valves, because the flapper actuator is situated below the flapper and must pass through the upper end of the tubing, it must have an outer diameter that is smaller than the inner diameter of the tubing. The present invention uses an actuator, liner sleeve 53, situated above the flapper and having an inner diameter equal to the inner diameter of tubing 46. This allows a larger inner diameter through the flapper valve without increasing the outer diameter.

Though described in specific terms using specific components, the invention is not limited to those components. Other elements may be interchangeably used, perhaps with slight modifications to account for variations. For example, valve types other than a flapper valve can be used. Also, the invention may have other applications in which it is desirable to apply tubing pressure that are within the scope of this invention. For example, tubing pressure may be used to inflate or actuate a packer or other downhole component.

Other methods of providing power for opening the flapper can be used with the flapper arrangement described herein. A nitrogen gas spring, a compressible liquid spring, a mechanical spring, an atmospheric bias spring, a rupture disc, a hydro-mechanical pressure pulse operated power module, or a smart actuator could be used to provide power to actuate the flapper valve. An indexing mechanism in conjunction with a nitrogen gas power spring, as described in U.S. Pat. No. 6,352,119, can be used to operate the flapper valve with appropriate modifications.

Although only a few example embodiments of the present invention are described in detail above, those skilled in the art will readily appreciate that many modifications are possible in the example embodiments without materially departing from the novel teachings and advantages of this invention. Accordingly, all such modifications are intended to be included within the scope of this invention as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A completion system for use in a well, the system comprising:
    a housing having a passageway therethrough;
    a valve module located in the housing and having a valve to allow or block fluid flow through the passageway;
    a power module moveably mounted to the housing, the power module comprising a power sleeve and a liner sleeve attached to the power sleeve; and
    a tubing mounted to the valve and comprising at least one port to selectively allow bypass of the valve, wherein
    the valve does not significantly impede entry of well bore fluids into the passageway from below the valve, and
    the power module is adapted to first engage the valve with the power sleeve to open the valve and after the opening of the valve, insert the liner sleeve through a seat of the valve to secure the valve in the open position.

2. The completion assembly of claim 1, in which the power module further comprises a power sleeve having a piston head that travels in a sealed chamber.

3. The completion assembly of claim 2, further comprising a control line in fluid communication with the sealed chamber.

4. The completion assembly of claim 2, in which the power sleeve has a selective profile.

5. The completion assembly of claim 1, in which the valve module further comprises a valve sleeve.

6. The completion assembly of claim 5, in which the valve sleeve has a tapered lower end.

7. The completion assembly of claim 5, in which the valve sleeve has a shoulder to engage a complementary shoulder on a power sleeve.

8. The completion assembly of claim 1, in which the valve module further comprises a flapper valve.

9. The completion assembly of claim 8, in which the flapper valve has a tang extending from a flapper in the flapper valve.

10. The completion assembly of claim 1, wherein the tubing and the housing form an annular recess.

11. The completion assembly of claim 1, further comprising: a sleeve moveably mounted to the tubing to block or allow flow through the at least one port.

12. The completion system of claim 1, wherein the valve comprises a sealing element adapted to rotate toward the power sleeve in response to the valve opening.

13. The completion system of claim 1, wherein the liner sleeve is not inserted into the valve seat until after the power sleeve engages the valve to open the valve.

14. A flapper valve usable with a subterranean well, the flapper valve comprising:
    a flapper and a flapper actuator in which the flapper actuator causes the flapper to rotate toward the actuator as the actuator opens the flapper valve, the flapper adapted to selectively control well fluid communication between a passageway located uphole of the flapper and a location downhole of the flapper and the flapper adapted to not significantly impede entry of well fluid from the downhole location into the passageway, wherein
    the actuator comprises a sleeve to exert a force on the flapper to open the flapper and cause the flapper to rotate toward the sleeve as the actuator opens the flapper valve, and the actuator comprises another sleeve to move into a valve seat associated wit the flapper in response to the actuator opening the flapper valve.

15. A method usable in a subterranean well, the method comprising:
    placing a valve actuator on the same side of a flapper of a flapper valve as the opening direction of the flapper to selectively move the flapper to control well fluid communication between a location downhole of the flapper and a passageway located uphole of the flapper;
    constructing the flapper valve so that the flapper does not significantly impede entry of a well fluid from the downhole location into the passageway;
    moving a sleeve to exert a force on the flapper to open the flapper and cause the flapper to rotate toward the sleeve as the actuator opens the flapper valve; and
    moving another sleeve into a valve seat associated with the flapper in response to the opening of the flapper valve.

* * * * *